United States Patent [19]

Fink et al.

[11] Patent Number: 5,193,837
[45] Date of Patent: Mar. 16, 1993

[54] UNIVERSALLY ADJUSTABLE TRAILER HITCH

[75] Inventors: Raymond W. Fink; Wayne E. Sousley, both of Elkhart; Richard L. Fullhart, Goshen, all of Ind.

[73] Assignee: Trimas Corporation, Ann Arbor, Mich.

[21] Appl. No.: 863,818

[22] Filed: Apr. 6, 1992

Related U.S. Application Data

[63] Continuation of Ser. No. 570,336, Aug. 21, 1990, Pat. No. 5,102,156.

[51] Int. Cl.⁵ .......................... B60D 1/00; B60D 1/14
[52] U.S. Cl. .................................................. 280/495
[58] Field of Search ................. 280/49.5, 460.1, 456.1, 280/501

[56] References Cited

U.S. PATENT DOCUMENTS

| | | |
|---|---|---|
| 2,408,531 | 10/1946 | Riemann . |
| 3,294,420 | 12/1966 | Martin . |
| 3,485,514 | 12/1969 | Stewart ............................... 280/495 |
| 4,032,170 | 6/1977 | Wood .................................... 280/495 |
| 4,405,148 | 9/1983 | Dickerson . |
| 4,610,458 | 9/1986 | Garnham . |
| 4,648,617 | 3/1987 | Hannappel . |
| 5,102,156 | 4/1992 | Fink et al. .......................... 280/495 |

FOREIGN PATENT DOCUMENTS

| | | |
|---|---|---|
| 202798 | 11/1954 | Australia . |
| 865401 | 2/1953 | Fed. Rep. of Germany ...... 280/495 |
| 2702728 | 7/1978 | Fed. Rep. of Germany . |

Primary Examiner—Mitchell J. Hill
Attorney, Agent, or Firm—Leon E. Redman; Malcolm L. Sutherland

[57] ABSTRACT

A universally adjustable trailer hitch for attaching to the frames of vehicles of different widths comprising a horizontally disposed tube member with a hitching device centrally attached thereto, the tube member is selectively clamped on each side of the hitching device by a clamping member to a support member to adjustably fix the position of each of the support members with respect to the tube member.

20 Claims, 3 Drawing Sheets

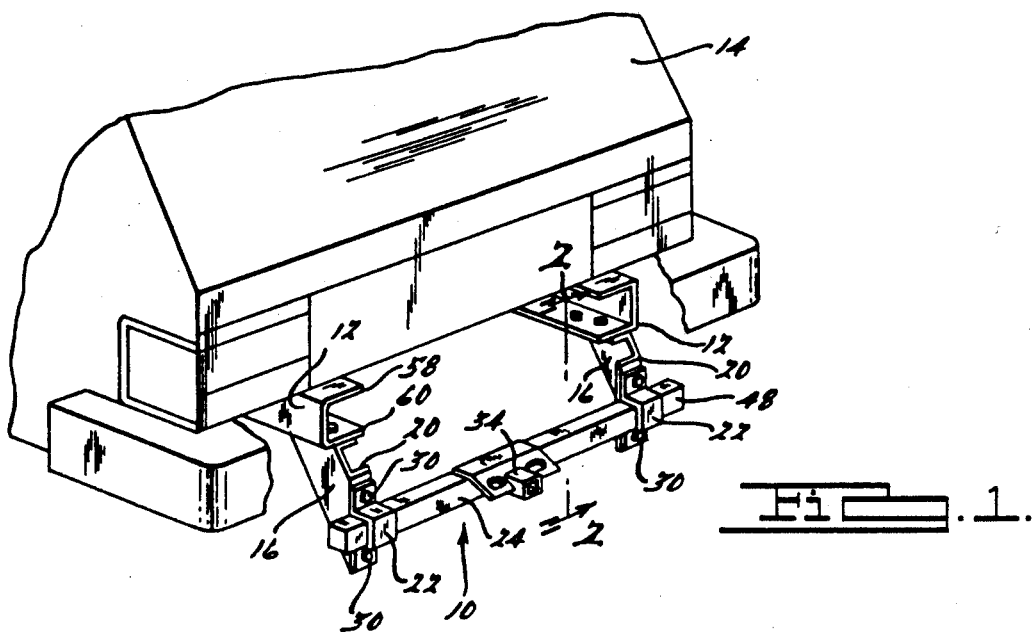
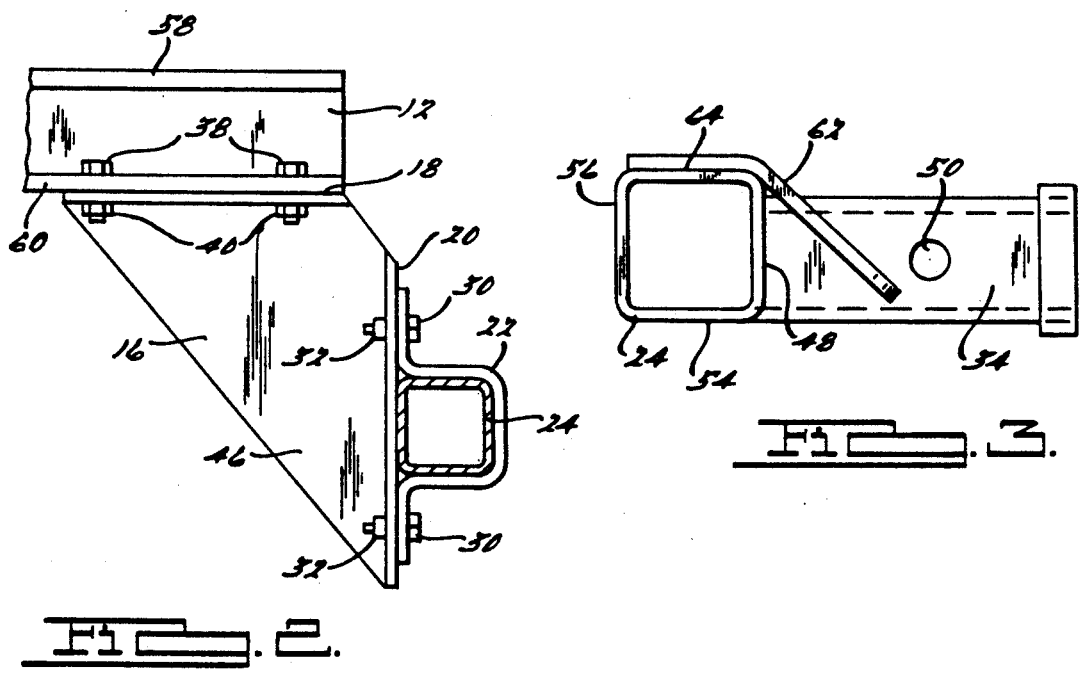
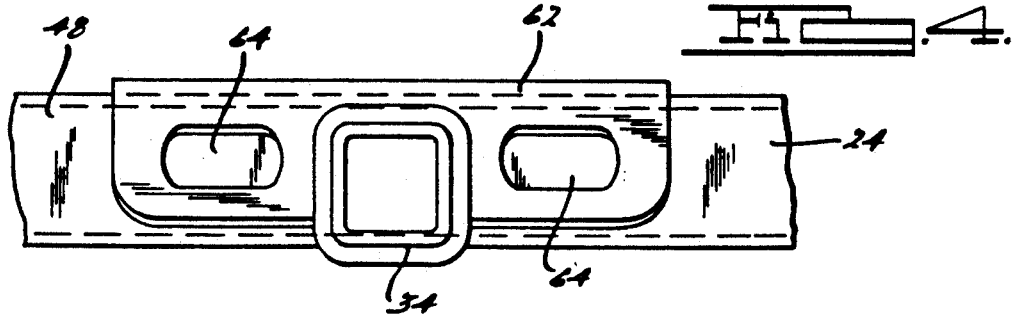

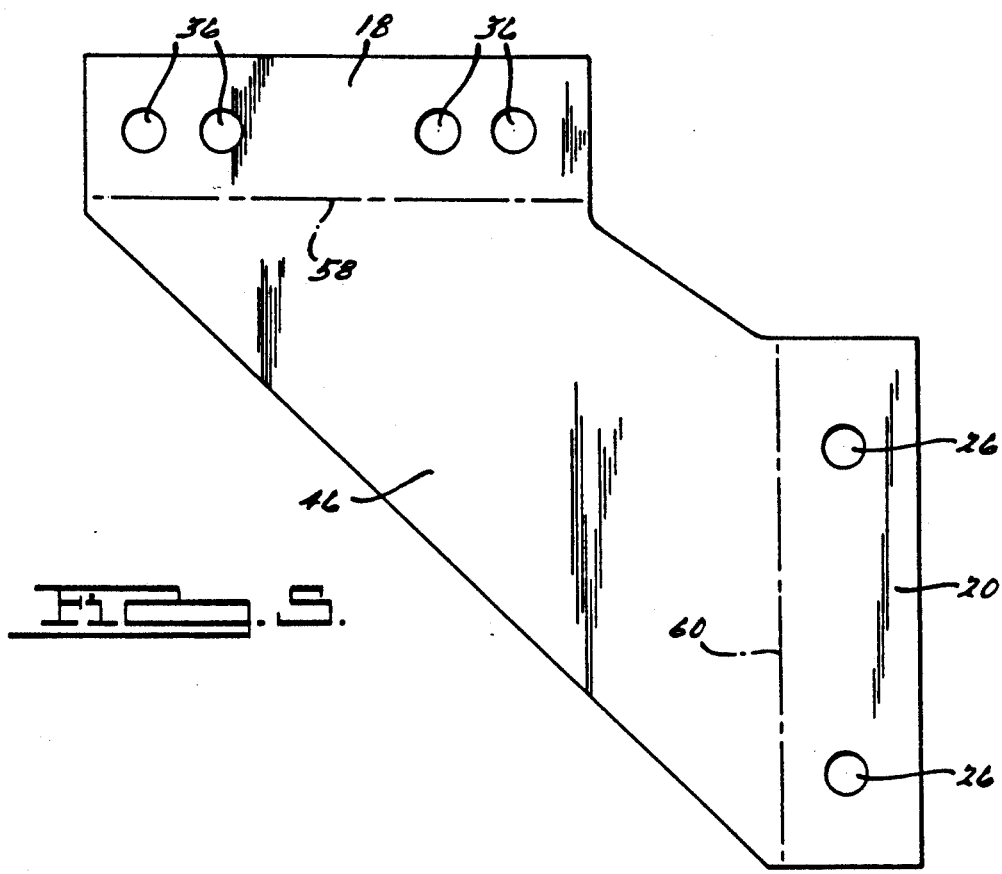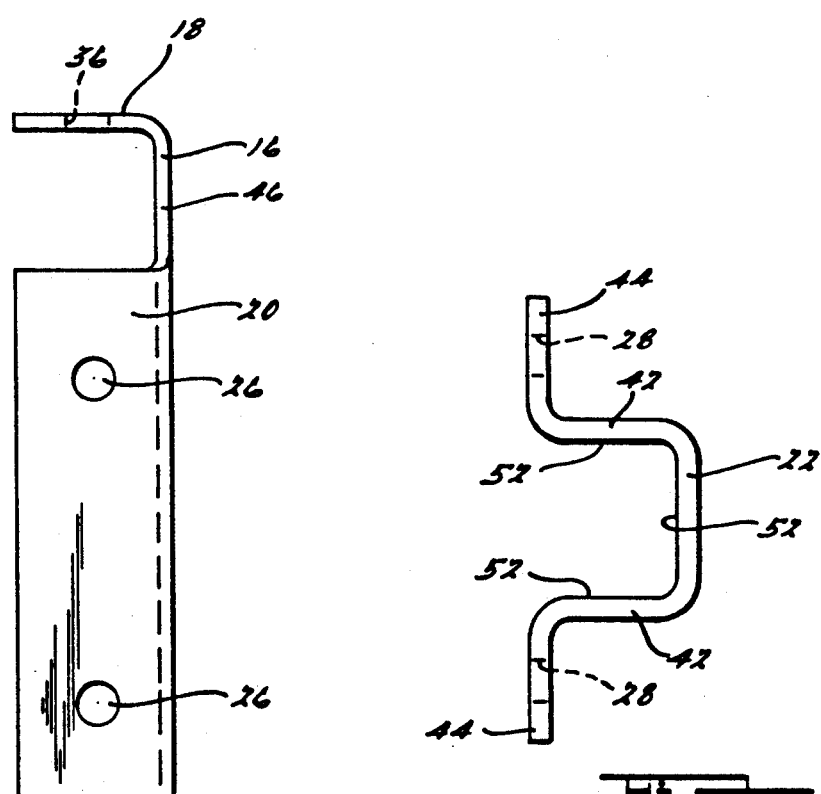

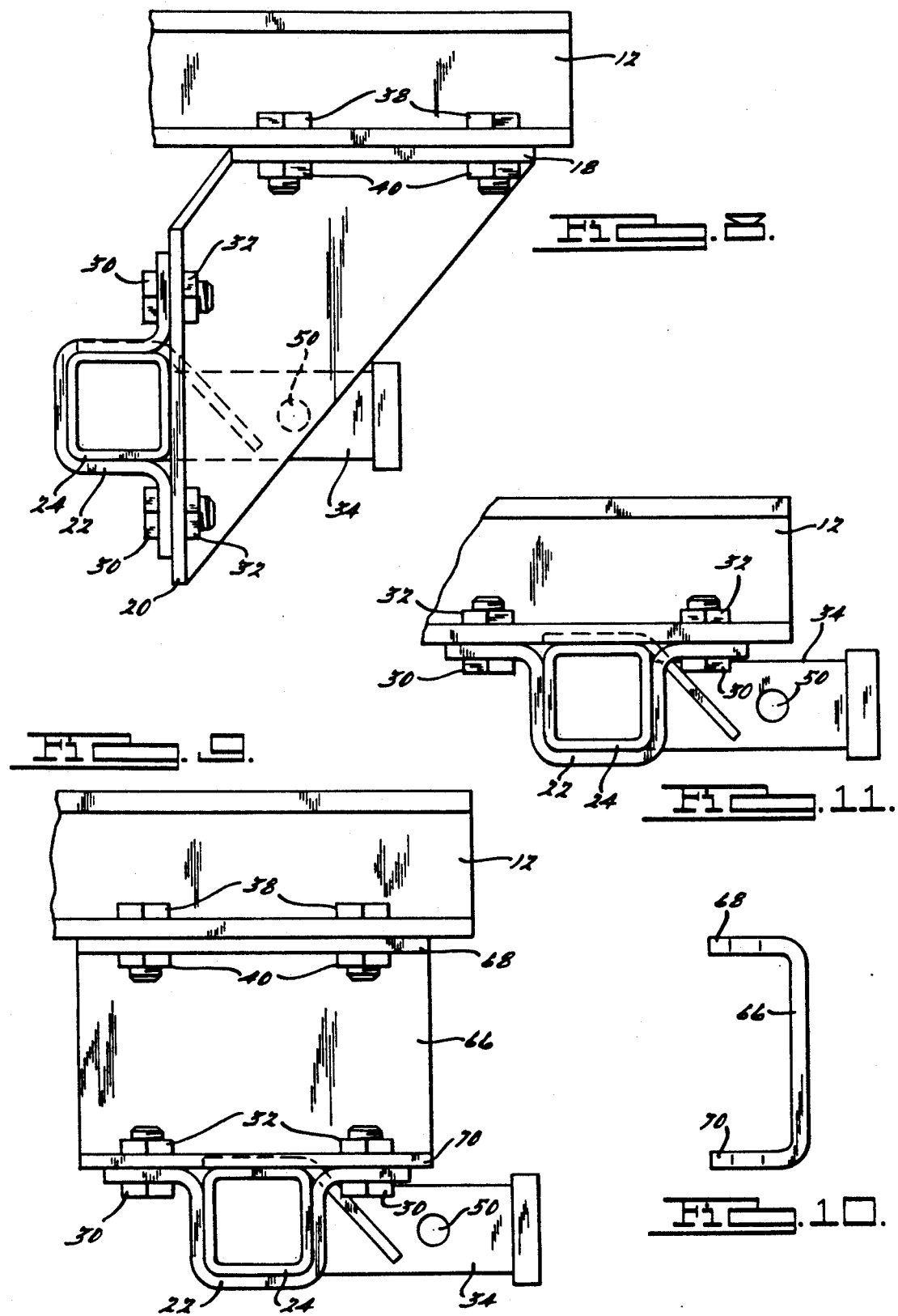

UNIVERSALLY ADJUSTABLE TRAILER HITCH

This is a continuation of copending application Ser. No. 07/570,336 filed on Aug. 21, 1990, issued as U.S. Pat. No. 5,102,156 on Apr. 7, 1992.

FIELD OF THE INVENTION

This invention relates to a universally adjustable trailer hitch which can be attached to the frames of vehicles of different widths.

BACKGROUND OF THE INVENTION

The prior art is replete with different forms of trailer hitches The prior art is replete to for vehicles. Many of these prior art hitches are adapted to fit a limited number of vehicles and are not capable of accommodating vehicles of different widths. The widths between the frame members of different vehicles can vary more than nine inches and it has been generally necessary for firms which sell this type of product to carry a large inventory of trailer hitch assemblies to satisfy the needs of their customers.

Attachment of trailer hitches has also been made more difficult by the many varied vehicle rear bumper configurations, as for example, the increasing use of plastic covered bumpers. Further, many of the more recent bumper designs are totally unsuitable for the normally encountered trailer hitch loads.

While certain of the prior art has addressed the hitch "adjustability" question, they have disclosed highly complex, difficult to use and inherently expensive trailer hitches. Examples of such prior art patents are Reimann et al U.S. Pat. No. 2,408,531 and Garnham U.S. Pat. No. 4,610,458; both of which provide a very limited range of adjustability.

Accordingly, there is a current and important need to provide a simple, easy to use, inexpensive, universally adjustable trailer hitch which can be attached to the frames of a wide range of vehicles of different widths.

SUMMARY OF THE INVENTION

It is a very important object of the present invention to provide a universally adjustable trailer hitch for attaching to the frames of vehicles of different widths comprising a horizontally disposed tube member with a hitching device centrally attached thereto, the tube member is selectively clamped on each side of the hitching device by a clamping member to a support member to adjustably fix the position of each of the support members with respect to the tube member.

It is another very important object of the present invention to provide a universally adjustable trailer hitch for attaching to the frames of vehicles of different widths comprising two bracket members, each bracket member having a generally upwardly facing portion for mating to the vehicle frame for attachment thereto near the rearward end thereof and a generally rearwardly facing portion to which a generally U-shaped clamping member is adjustably attached by fastening means a horizontally disposed tube member is provided with a hitching means centrally attached thereto, said tube member is selectively clamped on each side of said hitching means by one of said U-shaped clamping members to said rearwardly facing portion of each said bracket members to adjustably fix the position of each of said bracket members with respect to said tube member.

It is another important object of the present invention to provide a universally adjustable trailer hitch for attaching to the frames of vehicles of different widths wherein said upwardly facing portion is provided with one or more apertures, at least one aperture in registration with a corresponding aperture in said vehicle frame, each registering aperture receiving a threaded bolt member and each said bolt member threadably receiving a threaded nut for fixedly attaching each said bracket to said vehicle frame.

It is still another important object of the present invention to provide a universally adjustable trailer hitch for attaching to the frames of vehicles of different widths wherein said rearwardly facing portion is provided with one or more apertures, at least one aperture in registration with a corresponding aperture provided in said U-shaped clamping member, each registering aperture receiving said fastening means including threaded bolt members, each said bolt members threadably receiving a threaded nut for adjustably attaching said U-shaped clamping member to said rearwardly facing portion with said tube member selectively clamped therebetween.

It is yet another important object of the present invention to provide a universally adjustable trailer hitch for attaching to the frames of vehicles of different widths wherein each of the legs of the U-shaped portion of said U-shaped clamping member terminates in an outwardly projecting ear, each ear having an aperture therethrough.

It is still another important object of the present invention to provide a universally adjustable trailer hitch for attaching to the frames of vehicles of different widths wherein each of said ears of said U-shaped clamping member projects perpendicularly outwardly from each said legs of said U-shaped portion.

It is still another important object of the present invention to provide a universally adjustable trailer hitch for attaching to the frames of vehicles of different widths wherein said hitching means includes a hitch box.

It is another important object of the present invention to provide a universally adjustable trailer hitch for attaching to the frames of vehicles of different widths wherein said tube member is generally square in cross section and said hitch box projects perpendicularly from the rearwardly facing side of said tube.

It is yet another important object of the present invention to provide a universally adjustable trailer hitch for attaching to the frames of vehicles of different widths wherein said hitch box is a tubular member square in cross section and adapted to receive a hitch ball supporting member.

It is still another important object of the present invention to provide a universally adjustable trailer hitch for attaching to the frames of vehicles of different widths wherein the inwardly facing clamping surfaces of said U-shaped clamping member are in intimate clamping contact with three faces of said tube member with the fourth forwardly projecting face of said tube member being seated on said rearwardly facing portion of said bracket member.

It is yet another important object of the present invention to provide a universally adjustable trailer hitch for attaching to the frames of vehicles of different widths wherein said bracket member is formed from a flat sheet metal plate and each said upwardly and rearwardly facing portions extend perpendicularly from a body portion of said bracket member.

It is another important object of the present invention to provide a universally adjustable trailer hitch for attaching to the frames of vehicles of different widths wherein each said upwardly and rearwardly facing portions are elongated flat flanges.

It is yet another important object of the present invention to provide a universally adjustable trailer hitch for attaching to the frames of vehicles of different widths wherein the planes of each said upwardly and rearwardly facing elongated flat flanges perpendicularly intersect.

It is still another important object of the present invention to provide a universally adjustable trailer hitch for attaching to the frames of vehicles of different widths wherein each said upwardly and rearwardly facing elongated flat flanges are formed such that they extend perpendicularly outward from said body portion of said bracket member.

It is another important object of the present invention to provide the combination of a universally adjustable trailer hitch for attaching to the frames of vehicles of different widths and a vehicle having two spaced apart longitudinally extending frame members, said trailer hitch comprising two bracket members, each bracket member having a first flange portion for mating of each said bracket members to each said vehicle frame members for attachment thereto near the rearward end thereof by a first fastening means and a second flange portion to which a clamping member is adjustably attached by a second fastening means, a horizontally disposed tube member is provided with a hitching means attached thereto, said tube member is selectively clamped on each side of said hitching means by one of said clamping members to said second flange portion of each said bracket members to adjustably fix the position of each of said bracket members with respect to said tube member to position said hitching means between said frame members.

It is another important object of the present invention to provide the combination of a universally adjustable trailer hitch for attaching to the frames of vehicles of different widths and a vehicle having two spaced apart longitudinally extending frame members wherein said vehicle frame members are generally C-shaped having an upper and lower flange, said first flange portion of each said bracket members attached to said lower flange.

It is another important object of the present invention to provide the combination of a universally adjustable trailer hitch for attaching to the frames of vehicles of different widths and a vehicle having two spaced apart longitudinally extending frame members wherein said upper and lower flanges project inwardly and said first flange portion of each said bracket members are elongated flat flanges attached to said lower flange.

It is yet another important object of the present invention to provide the combination of a universally adjustable trailer hitch for attaching to the frames of vehicles of different widths and a vehicle having two spaced apart longitudinally extending frame members wherein said first flange portion is provided with one or more apertures, at least one said aperture in registration with a corresponding aperture in said lower flange of said C-shaped vehicle frame member, each registering aperture receiving a threaded bolt member and each said bolt member threadably receiving a threaded nut for fixedly attaching each said bracket member to said lower flange.

It is still another important object of the present invention to provide a universally adjustable trailer hitch for attaching to the frames of vehicles of different widths wherein said clamping members are two generally U-shaped clamping member and said support members are two bracket members, each bracket member having a generally upwardly facing portion for mating to the vehicle frame for attachment thereto near the rearward end thereof and a generally forwardly facing portion to which a generally U-shaped clamping member is adjustably attached by fastening means, a horizontally disposed tube member is provided with a hitching means centrally attached thereto, said tube member is selectively clamped on each side of said hitching means by one of said U-shaped clamping members to said forwardly facing portion of each said bracket members to adjustably fix the position of each of said bracket members with respect to said tube member.

It is yet another important object of the present invention to provide a universally adjustable trailer hitch for attaching to the frames of vehicles of different widths wherein said clamping members are two generally U-shaped clamping member and said support members are two spaced apart frame members of said vehicle to which said generally U-shaped clamping member is adjustably attached by fastening means, a horizontally disposed tube member is provided with a hitching means centrally attached thereto, said tube member is selectively clamped on each side of said hitching means by one of said U-shaped clamping members to each of said vehicle frame members to adjustably fix the position said tube member with respect to said vehicle frame members.

It is still another important object of the present invention to provide a universally adjustable trailer hitch for attaching to the frames of vehicles of different widths wherein said clamping members are two generally U-shaped clamping member and said support members are two bracket members, each bracket member having a generally upwardly facing portion for mating to the vehicle frame for attachment thereto near the rearward end thereof and a generally downwardly facing portion to which a generally U-shaped clamping member is adjustably attached by fastening means, a horizontally disposed tube member is provided with a hitching means centrally attached thereto, said tube member is selectively clamped on each side of said hitching means by one of said U-shaped clamping members to said downwardly facing portion of each said bracket members to adjustably fix the position of each of said bracket members with respect to said tube member.

It is still another important object of the present invention to provide a universally adjustable trailer hitch for attaching to the frames of vehicles of different widths wherein said bracket members are two generally C-shaped members.

It is still another very important object of the present invention to provide the combination of a universally adjustable trailer hitch for attaching to the frames of vehicles of different widths and a vehicle having two spaced apart longitudinally extending frame members, said trailer hitch comprising two bracket members, each bracket member having a generally upwardly facing portion for mating of each said bracket members to each said vehicle frame members for attachment thereto near the rearward end thereof by a first fastening means and a generally rearwardly facing portion to which a generally U-shaped clamping member is adjustably attached by a second fastening means, a horizontally disposed tube member is provided with a hitching means centrally attached thereto, said tube member is selectively clamped on each side of said hitching means by one of said U-shaped clamping members to said rearwardly facing portion of each said bracket members to adjustably fix the position of each of said bracket members with respect to said tube member to centrally position said hitching means between said frame members.

It is still another important object of the present invention to provide the combination of a universally adjustable trailer hitch for attaching to the frames of vehicles of different widths and a vehicle having two spaced apart longitudinally extending frame members wherein said vehicle frame members are generally C-shaped having an upper and lower flange, said upwardly facing portion of each said bracket members attached to said lower flange.

It is still another important object of the present invention to provide the combination of a universally adjustable trailer hitch for attaching to the frames of vehicles of different widths and a vehicle having two spaced apart longitudinally extending frame members wherein said upper and lower flanges project inwardly and said upwardly facing portion of each said bracket members elongated flat flanges attached to said lower flange.

It is yet another very important object of the present invention to provide the combination of a universally adjustable trailer hitch for attaching to the frames of vehicles of different widths and a vehicle having two spaced apart longitudinally extending frame members wherein said upwardly facing elongated flange is provided with one or more apertures, at least one said aperture in registration with a corresponding aperture in said lower flange of said C-shaped vehicle frame member, each registering aperture receiving a threaded bolt member and each said bolt member threadably receiving a threaded nut for fixedly attaching each said bracket member to said lower flange.

These and other objects and advantages of the invention as well as the details of the illustrative embodiment, will be more fully understood from the following specification and drawings, in which:

BRIEF DESCRIPTION OF THE DRAWINGS

The accompanying drawings, which are incorporated in and constitute a part of this specification, illustrate a preferred embodiment of the invention and, together with the description of the invention given above and the detailed description of the preferred embodiment given below, serve to explain the principles of the invention.

FIG. 1 is a perspective view of the universally adjustable trailer hitch of the present invention attached to rearward end of the frame members of a vehicle;

FIG. 2 is a partial sectional view taken on line 2—2 of FIG. 1;

FIG. 3 is an end view of the tube member of the universally adjustable trailer hitch of FIG. 1;

FIG. 4 is a partial front view of the tube member of the universally adjustable trailer hitch of FIG. 1;

FIG. 5 is a partially formed sheet metal plate from which the bracket member of the universally adjustable trailer hitch of FIG. 1 is finally formed;

FIG. 6 is an end view of the finally formed sheet metal support member or bracket member of the universally adjustable trailer hitch of FIG. 1;

FIG. 7 is an end view of the clamping member of the universally adjustable trailer hitch of FIG. 1;

FIG. 8 is a partial end view of another embodiment of the universally adjustable trailer hitch of the present invention;

FIG. 9 is a partial end view of another embodiment of the universally adjustable trailer hitch of the present invention;

FIG. 10 is an end view of the support member or bracket member of the universally adjustable trailer hitch of FIG. 9;

FIG. 11 is a partial end view of another embodiment of the universally adjustable trailer hitch of the present invention.

DETAILED DESCRIPTION OF THE INVENTION

Throughout the following description and drawings, an identical reference number is used to refer to the same element shown in the several figures of the drawings.

Referring to FIGS. 1-7, the universally adjustable trailer hitch of the invention is indicated at 10 which is shown attached near the rearward end of the frame members 12 of a vehicle 14.

The lateral distance between the two spaced apart longitudinally disposed frame members 12 is easily accommodated by the universally adjustable trailer hitch of the invention. This variation in width can vary by vehicle model (and year of manufacture) as well as by vehicle manufacturer. This variation in lateral width between the frame members of a small pickup truck and a full sized van can exceed nine inches.

The universally adjustable trailer hitch 10 includes two support or bracket members 16. The bracket members 16 are mirror images of each other, however, each bracket member could be interchanged if required for an installation to the frame members of a particular vehicle.

Each bracket member 16 has a generally upwardly facing portion 18 for mating to the vehicle frame members 12 for attachment thereto near the rearward end thereof. Each bracket member 16 is further provided with a generally rearwardly facing portion 20. Each upwardly and rearwardly facing portions 18 and 20 are elongated flat flanges. As can best be seen from FIG. 6, the planes defined by each of the elongated flanges 18 and 20 perpendicularly interset. Further, each of the upwardly and rearwardly facing elongated flat flanges 18 and 20 are formed such that they extend perpendicularly outward from the body portion 46 of the bracket members 16.

A generally U-shaped clamping member 22 is adjustably attached to the rearwardly facing elongated flat flange 20 to selectively clamp a tube member 24 to the flange 20 to adjustably fix the position of each of the bracket members 16 with respect to the tube member 24. The rearwardly facing flange 20 is provided with one or more apertures 26 which are in registration with corresponding apertures 28 provided in the U-shaped clamping member 22.

The legs 42 of the U-shaped portion of said U-shaped clamping member 22 terminate in an outwardly projecting ear 44, each ear 44 has an aperture 26 therethrough. The ears 44 of the U-shaped clamping member 22 project perpendicularly outwardly from each of the legs 44.

The registering apertures 26 and 28 receive threaded bolt members 30 and each bolt members threadably receive a threaded nut 32 for adjustably attaching the U-shaped clamping member 22 to said rearwardly facing flange 20 with the tube member 24 selectively clamped therebetween.

The horizontally disposed tube member 24, which may be square in cross section, is provided with a hitch box 34 which is centrally attached, as by welding, to the tube member 24. The hitch box 34, which may be a tubular member square in cross section, projects perpendicularly from the rearwardly facing side 48 of the tube member 24. The hitch box 34 is adapted to receive a standard hitch ball supporting member (not shown) and is provided with an aperture 50 which receives a locking pin (not shown) to hold the hitch ball supporting member in place within the hitch box 34. A plate member 62 with elliptical openings 64 is also attached to the tube member 24 to provide an anchoring point for safety chains (not shown).

As can best be seen in FIG. 1, the tube member 24 is selectively clamped on each side of said hitch box 34 by one of the U-shaped pair of brackets 22 to the rearwardly facing flange 20 of each of the bracket members 16 to adjustably fix the position of each of the bracket members 16 with respect to the tube member 24.

The inwardly facing clamping surfaces 52 of the central portion of the U-shaped bracket or clamping member 22 are in intimate clamping contact with three faces 48, 52 and 64 of the tube member 24 with the fourth forwardly projecting face 56 of the tube member 24 being seated on the rearwardly facing flat flange 20 of each of the bracket members 16.

The upwardly facing flange 18 is provided with one or more apertures 36 which are in registration with corresponding apertures (not shown) which may be provided in the vehicle frame members 12. The registering apertures receive a threaded bolt member 38, each of which threadably receive a threaded nut 40 for fixedly attaching each bracket member 16 to the vehicle frame members 12.

As can be seen in FIG. 5, the bracket members 16 may be formed from a flat sheet metal plate with the bend lines for the flat flanges 18 and 20 being denoted at 58 and 60 respectively. The bracket members 16 may be fabricated from a flat sheet metal plate of AISI-1012 steel while the clamping members 22 may be fabricated from flat sheet metal plate of AISI-1012 steel. The tube member 24 may be fabricated from ASTM-A-500 Grade B steel tubing.

The two spaced apart longitudinally extending frame members 12 of the vehicle 14 are generally C-shaped having an upper flange 58 and lower flange 60. The upwardly facing flange 18 of each of the bracket members 16 are attached at the downward projecting surface of the lower flange 60. The hitch 10 of the invention, is of course, suitable for use with other frame configurations such as box frames and the like. Typically, the lower frame flanges of vehicles are provided with a number of apertures near their rearward end for a number of purposes and these apertures may be used to attach the hitch 10 to the vehicle. If no such apertures are so provided, then they may be suitably drilled in the lower flange or like member without weakening the frame member.

In summary, the universally adjustable trailer hitch 10 for attaching to the frames of vehicles of different widths, is easily adjusted by simply loosening the nuts 32 on bolts 30 which effect the selective clamping of the tube member 24 against the flange 20 by the U-shaped clamping members 22. This loosening action allows for relative movement between the bracket members 16 and the tube member 24 to centrally locate the hitch box 34 and accommodate different lateral widths of different vehicles. The upward facing flange 18 is provided with a plurality of apertures so that they may be aligned with different patterns of apertures found near the rearward end of the frame members of different vehicles.

Referring to FIGS. 8-11, there is shown three additional embodiments of the universally adjustable trailer hitch of the invention.

These three embodiments illustrate the flexibility of the present invention in that they show different attachment orientations of the universally adjustable trailer hitch to the rearward end of the frame members 12 of a vehicle (not shown in FIGS. 8-11).

The FIG. 8 embodiment of the universally adjustable trailer hitch of the invention is essentially the same as the universally adjustable trailer hitch of FIGS. 1-7 except that the position of the bracket members 16 of FIG. 8 is reversed. In the reversed position of FIG. 8, the rearwardly facing flange 20 of FIGS. 1-7 is facing forwardly with respect to the vehicle. Accordingly, the hitch box 34 of the FIG. 8 embodiment is in a more forward position with respect to the vehicle than that of the FIG. 1-7 embodiment.

The FIG. 9 and FIG. 10 embodiment of the universally adjustable trailer hitch of the invention is generally the same as the universally adjustable trailer hitches of FIGS. 1-8 except that the support or bracket members 16 of FIGS. 1-8 has been replaced by a generally C-shaped support or bracket members 66 (only one bracket member 66 shown in FIGS. 9 and 10). Elongated flange 68 generally performs the function of flange 18 of bracket member 16 of FIGS. 1-8 and similarly, elongated flange 70 generally performs the function of flange 20 of bracket member 16 of FIGS. 1-8.

The FIG. 11 embodiment of the universally adjustable trailer hitch of the invention is generally the same as the universally adjustable trailer hitches of FIGS. 1-10 except that the support or bracket members 16 of FIGS. 1-8 and the support or bracket members 66 of FIGS. 9 and 10 have been eliminated. In the FIG. 11 embodiment of the universally adjustable trailer hitch of the invention, the clamping members 22 are attached directly to the frame member 12 of the vehicle.

While the present invention has been illustrated by description of several embodiments and while these embodiments have been described in considerable detail, it is not the intention of the Applicant to restrict or in any way limit the scope of the appended claims to such detail. Additional advantages and modifications will readily occur to those skilled in the art. The invention in its broader aspects is therefore not to be limited to the specific details shown and described. Accordingly, departures may be made from such details without departing from the spirit or the scope of the Applicant's general inventive concept.

What is claimed is:

1. A trailer hitch for attachment to the underside of a vehicle at spaced apart locations of varying width comprising:

an elongated member provided with at least three outwardly disposed sides;

a trailer hitching member secured to one of the sides of the elongated member at a location generally centrally disposed between the ends of said elongated member;

a pair of brackets for attaching said elongated member to the underside of said vehicle at said spaced apart locations;

at least one of said brackets having a generally U-shaped central portion with ears projecting from opposite sides thereof and said central portion provided with three inwardly disposed surfaces complementary in configuration to said three corresponding outwardly disposed sides of said elongated member; and means for securing said ears to the underside of the vehicle with said three inwardly disposed surfaces of the central portion of said bracket in intimate contact with the three corresponding outwardly disposed sides of said elongated member.

2. The trailer hitch of claim 1 wherein said elongated member is substantially square in cross-sectional configuration.

3. The trailer hitch of claim 1 wherein said trailer hitching member comprises a tubular hitch box substantially square in cross-section.

4. The trailer hitch of claim 3 further comprising a plate member attached to said elongated member and anchoring means disposed on said plate member to secure a safety chain thereto.

5. The trailer hitch of claim 4 wherein said anchoring means comprises a pair of spaced apart anchoring apertures through said plate member, said anchoring apertures disposed adjacent opposite sides of said hitch box.

6. The trailer hitch of claim 1 wherein each of said ears is provided with an aperture therethrough in registration with apertures provided on the underside of said vehicle and said means for securing said ears comprises a bolt extending through the registered apertures in said ears and the underside of said vehicle.

7. The trailer hitch of claim 1 further comprising a pair of support members each attached to one of said brackets and the underside of said vehicle.

8. The trailer hitch of claim 7 wherein each of said support members includes two flanges, one of said flanges for attachment to one of said brackets and the other of said flanges for attachment to the underside of said vehicle.

9. The trailer hitch of claim 8 wherein said two flanges of each of said support members are disposed generally parallel to each other.

10. The trailer hitch of claim 8 wherein said two flanges of each of said support members are disposed generally perpendicular to each other.

11. The trailer hitch of claim 9 wherein each of said support members is formed from a flat plate with said two flanges formed by bending opposite edges of the flat plate.

12. The trailer hitch of claim 10 wherein each of said support members is formed from a flat plate with said two flanges formed by bending generally perpendicularly disposed edges of the flat plate.

13. A trailer hitch for attachment to the underside of a vehicle at spaced apart locations which spacing may vary in width comprising:

an elongated member provided with at least three outwardly disposed sides;

a trailer hitching member extending outward from one side of said elongated member;

a pair of support brackets each having two flanges;

means for securing one of said flanges of each of said support brackets to the underside of said vehicle at said spaced apart locations;

a pair of clamps for clamping said elongated member to the other of said flanges of each of said support brackets, each of said clamps having a central portion with three inwardly directed surfaces complementary in configuration to and in intimate contact with the three outwardly disposed sides of said elongated member.

14. The trailer hitch of claim 13 wherein said trailer hitching member comprises a tubular hitch box substantially square in cross-section.

15. The trailer hitch of claim 13 wherein each of said clamps include ears extending from opposite sides of said central portion and means for securing said ears to said other flanges of said support brackets.

16. The trailer hitch of claim 13 wherein said two flanges of each of said support brackets are spaced apart and disposed generally parallel to each other.

17. The trailer hitch of claim 13 wherein said two flanges of each of said support brackets are disposed generally perpendicular to each other.

18. A universally mountable trailer hitch for attachment to two spaced apart frame members disposed on the underside of a vehicle wherein said frame members may be spaced apart various distances comprising:

an elongated member having a substantially square outside configuration;

a trailer hitching member extending rearwardly from a one side of said elongated member;

a pair of support brackets each having two flanges disposed generally perpendicular to each other with a body portion disposed therebetween, one of said flanges disposed in a generally horizontal plane and the other of said flanges disposed in a generally vertical plane;

means for fastening the generally horizontally disposed flange of each of said support brackets to the underside of one of said spaced apart frame members;

a pair of generally U-shaped clamps each having three inwardly disposed surfaces in intimate contact with three corresponding sides of said elongated member, each of said clamps having a central portion with legs terminating in oppositely projecting ears; and means for fastening said oppositely projecting ears of each of said clamps to the generally vertically disposed flange of one of said support brackets with the fourth side of said elongated member clamped against the generally vertically extending flanges of said support brackets.

19. The universally mountable trailer hitch of claim 18 wherein said trailer hitching member comprises a tubular hitch box substantially square in cross-section.

20. The universally mountable trailer hitch of claim 19 further comprising a plate member extending from said elongated member about said tubular hitch box, and a pair of spaced apart anchoring apertures provided in said plate members for securing a safety chain thereto.

* * * * *